(12) United States Patent
Carlson et al.

(10) Patent No.: US 9,174,871 B2
(45) Date of Patent: Nov. 3, 2015

(54) CEMENT SLURRIES HAVING PYRANOSE POLYMERS

(71) Applicant: Empire Technology Development LLC, Wilmington, DE (US)

(72) Inventors: William Brenden Carlson, Seattle, WA (US); Gregory D. Phelan, Cortland, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 158 days.

(21) Appl. No.: 13/946,710

(22) Filed: Jul. 19, 2013

(65) Prior Publication Data

US 2014/0128513 A1    May 8, 2014

(51) Int. Cl.
| | |
|---|---|
| *C04B 16/04* | (2006.01) |
| *C04B 24/38* | (2006.01) |
| *C04B 28/04* | (2006.01) |
| *C04B 28/06* | (2006.01) |
| *C04B 28/14* | (2006.01) |
| *C04B 28/18* | (2006.01) |
| *C08L 1/08* | (2006.01) |
| *C04B 103/00* | (2006.01) |
| *C04B 103/30* | (2006.01) |

(52) U.S. Cl.
CPC ............. *C04B 24/383* (2013.01); *C04B 28/04* (2013.01); *C04B 28/06* (2013.01); *C04B 28/14* (2013.01); *C04B 28/18* (2013.01); *C08L 1/08* (2013.01); *C04B 2103/0072* (2013.01); *C04B 2103/34* (2013.01)

(58) Field of Classification Search
CPC ........................................................ C04B 16/04
USPC ................................................................ 524/5
See application file for complete search history.

(56) References Cited

U.S. PATENT DOCUMENTS

| | | | |
|---|---|---|---|
| 3,153,593 | A | 10/1964 | De Pauw |
| 3,542,908 | A | 11/1970 | Sharples et al. |
| 4,156,777 | A | 5/1979 | Kimura |
| 4,323,487 | A | 4/1982 | Jones et al. |
| 4,476,593 | A | 10/1984 | Fanselow et al. |
| 4,587,331 | A | 5/1986 | Hlavka et al. |
| 4,601,757 | A | 7/1986 | Brown et al. |
| 4,771,105 | A | 9/1988 | Shirai et al. |
| 4,822,848 | A | 4/1989 | Ito et al. |

(Continued)

FOREIGN PATENT DOCUMENTS

| | | |
|---|---|---|
| BE | 603491 | 5/1961 |
| CN | 101438701 | 5/2009 |

(Continued)

OTHER PUBLICATIONS

Bahulekar, R. et al., "Polyacrylamide containing sugar residues: synthesis, characterization and cell compatibility studies," Carbohydrate Polymers, vol. 37, 1998, pp. 71-78.

(Continued)

*Primary Examiner* — Ling Choi
*Assistant Examiner* — Lanee Reuther
(74) *Attorney, Agent, or Firm* — Foley & Lardner LLP (57) ABSTRACT

A composition includes a cement component and an amidyl pyranose component. A method of making the composition includes mixing a cement component with an amidyl pyranose component.

20 Claims, 2 Drawing Sheets

(56) References Cited

U.S. PATENT DOCUMENTS

| | | |
|---|---|---|
| 4,865,640 A | 9/1989 | Avera |
| 4,996,059 A | 2/1991 | Grollier et al. |
| 5,002,680 A | 3/1991 | Schmidt et al. |
| 5,045,617 A | 9/1991 | Shih et al. |
| 5,232,688 A | 8/1993 | Ziegler et al. |
| 5,294,435 A | 3/1994 | Remz et al. |
| 5,474,768 A | 12/1995 | Robinson |
| 5,609,862 A | 3/1997 | Chen et al. |
| 5,646,100 A | 7/1997 | Haugk et al. |
| 5,698,052 A | 12/1997 | Russo et al. |
| 5,965,147 A | 10/1999 | Steffier |
| 5,993,857 A | 11/1999 | Menzel et al. |
| 6,133,212 A | 10/2000 | Elliott et al. |
| 6,277,892 B1 | 8/2001 | Deckner et al. |
| 6,410,668 B1 | 6/2002 | Chiari |
| 6,488,091 B1 | 12/2002 | Weaver et al. |
| 6,488,901 B1 | 12/2002 | Schmidt et al. |
| 6,552,103 B1 | 4/2003 | Bertozzi et al. |
| 6,613,378 B1 | 9/2003 | Erhan et al. |
| 6,664,356 B1 | 12/2003 | Shih |
| 6,875,426 B2 | 4/2005 | Candau |
| 7,422,735 B1 | 9/2008 | Hossel et al. |
| 7,423,090 B2 | 9/2008 | Doane et al. |
| 7,455,848 B2 | 11/2008 | Hessefort et al. |
| 7,541,414 B2 | 6/2009 | Lion |
| 7,560,428 B2 | 7/2009 | Hirai et al. |
| 7,597,879 B2 | 10/2009 | Gupta |
| 7,601,340 B2 | 10/2009 | Nojiri et al. |
| 7,671,007 B2 | 3/2010 | Carnali et al. |
| 7,754,192 B2 | 7/2010 | Wood et al. |
| 7,763,240 B2 | 7/2010 | Anderson et al. |
| 7,777,073 B2 | 8/2010 | Gupta |
| 7,780,954 B2 | 8/2010 | Polonka et al. |
| 7,785,575 B2 | 8/2010 | Anderson et al. |
| 7,794,839 B2 | 9/2010 | Schmidt et al. |
| 7,875,264 B2 | 1/2011 | Takakura et al. |
| 8,017,553 B2 | 9/2011 | Doane et al. |
| 8,316,580 B2 | 11/2012 | Krysiak et al. |
| 2002/0111281 A1 | 8/2002 | Vishnupad |
| 2002/0128346 A1 | 9/2002 | Domschke et al. |
| 2002/0150688 A1 | 10/2002 | Knight et al. |
| 2006/0035341 A1 | 2/2006 | Boeckh et al. |
| 2006/0113080 A1* | 6/2006 | Nguyen et al. ............ 166/308.1 |
| 2007/0031366 A1 | 2/2007 | Meyers et al. |
| 2007/0107638 A1 | 5/2007 | Chun et al. |
| 2008/0057206 A1 | 3/2008 | Igo et al. |
| 2008/0066509 A1 | 3/2008 | Turley |
| 2008/0281064 A1 | 11/2008 | Chiron et al. |
| 2009/0026338 A1 | 1/2009 | Bruce |
| 2009/0074823 A1 | 3/2009 | Takakura |
| 2009/0137771 A1 | 5/2009 | Moriyama et al. |
| 2009/0263338 A1 | 10/2009 | Rolland et al. |
| 2009/0297466 A1 | 12/2009 | Gutmann et al. |
| 2010/0003236 A1 | 1/2010 | Dalko et al. |
| 2010/0028284 A1 | 2/2010 | Atis et al. |
| 2010/0028285 A1 | 2/2010 | Frampton et al. |
| 2010/0074855 A1 | 3/2010 | Tanaka et al. |
| 2010/0090160 A1 | 4/2010 | Branning |
| 2010/0093535 A1 | 4/2010 | Rose et al. |
| 2010/0218781 A1 | 9/2010 | McNamara et al. |
| 2010/0275664 A1 | 11/2010 | Windhoevel |
| 2010/0291055 A1 | 11/2010 | Athanasiadis et al. |
| 2011/0028607 A1 | 2/2011 | Morgan et al. |
| 2011/0275577 A1 | 11/2011 | Priebe et al. |
| 2011/0282048 A1 | 11/2011 | Brumer et al. |
| 2012/0220454 A1 | 8/2012 | Chen et al. |
| 2012/0277099 A1 | 11/2012 | Olson et al. |
| 2014/0178344 A1 | 6/2014 | Carlson et al. |

FOREIGN PATENT DOCUMENTS

| | | |
|---|---|---|
| CN | 102511480 | 6/2012 |
| CN | 101723765 | 11/2012 |
| CZ | 278551 | 1/1994 |
| CZ | 8500097 | 1/1994 |
| DE | 11 54 815 | 9/1963 |
| DE | 28 05 185 | 7/1978 |
| EP | 0 186 085 | 7/1986 |
| EP | 0 608 353 | 8/1994 |
| EP | 1 516 612 | 3/2005 |
| EP | 1 704 769 | 9/2006 |
| EP | 1 820 490 | 8/2007 |
| GB | 0 935 290 | 8/1963 |
| GB | 1 099 372 | 1/1968 |
| JP | S-57-202309 | 12/1982 |
| JP | 63-280001 | 11/1988 |
| JP | 2007-206166 | 8/2007 |
| JP | 2009-175875 | 8/2009 |
| JP | 05-056707 | 10/2012 |
| WO | WO-91/05459 | 5/1991 |
| WO | WO-93/07856 | 4/1993 |
| WO | WO-99/64563 | 12/1999 |
| WO | WO-2004/028686 | 4/2004 |
| WO | WO-2008/132340 | 11/2008 |
| WO | WO-2012/022164 | 2/2012 |

OTHER PUBLICATIONS

Bird, T.P., et al, "Polyamides Containing Carbohydrate Residues. II. Benzylidenedioxy derivatives," Journal of the Chemical Society, 1963, pp. 3389-3391.

Bird, T.P., et al, "Preparation and Derivatives of Poly-(6-O-methacryloyl-D-galactose) and Poly-(6-O-acryloyl-D-galactose)," Journal of the Chemical Society (C), vol. 21, 1966, pp. 1913-1918.

Black, W.A.P. et al., "6-O-Methacryloyl-D-galactose: a reactive, water-soluble monomer," Die Makromolekulare Chemie, vol. 117, 1968, pp. 210-214.

Bock, K., et al, "Amino Acids and Amino Sugars from Bromodeoxyaldonolactones," Acta Chemica Scandinavica, B, vol. 41, 1987, pp. 435-441.

Botto, R.E., et al, "Nitrogen-15 Nuclear Magnetic Resonance Spectroscopy of Neomycin B and Related Aminoglycosides," Journal of the American Chemical Society, vol. 105, No. 4, 1983, pp. 1021-1028.

Brendel, K. et al., "Amino sugar synthesis. XIII. Mechanism of nucleophilic replacement of methanesulfonyl groups—simultaneous formation of D-gulosamine and D-galactosamine derivatives from D-glucosamine derivatives," Justus Liebigs Annalen der Chemie, vol. 683, 1965, pp. 182-186. (English Translation Not Available).

Brendel, K. et al., "Preparation of 2,6-diamino-2,6-dideoxy-D-arabino-hexose. An improved preparation of benzyl 3,4-di-O-acetyl-2-[(benzyloxycarbonyl)amino]-2-deoxy-α-D-glucurononitrile," Chemische Berichte, vol. 97, No. 5, 1964, pp. 1513. (English Translation Not Available).

Brendel, K., et al., "2-Amino-2.6-didesoxy-D-allose und 2-Amino2.6-didesoxy-Dglucose," Aminozuckersynthesen, XVI, 1966 pp. 192-197. (English Translation Not Available).

Brimacombe, J.S., et al, "A convenient synthesis of 2,6-diamino-2,6-dideoxy-D-gulose," Carbohydrate Research, vol. 25, 1972, pp. 522-525.

Chen, S. et al., "Synthesis of melamine-glucose resin adhesive," Science in China Series B: Chemistry, vol. 48, 2005, pp. 29-32.

Christiansen, A.W. et al., "Potential of carbohydrates for exterior-type adhesives," Forrest Products Journal, vol. 36, No. 7/8, Jul./Aug. 1986, pp. 20-28.

Collins, P.M., et al, "The Synthesis of Amino-sugars from Glycopyranosiduloses," Journal of the Chemical Society, 1965, pp. 3448-3456.

Dorn, H. et al., "Potential cytostats. V," Monatsberichte der Deutschen Akademie der Wissenschaften zu Berlin, vol. 6, No. 6, 1964, pp. 447-454. (English Translation Not Available).

Dos Santos, L.A., et al, "Dual-Setting Calcium Phosphate Cement Modified with Ammonium Polyacrylate," Artificial Organs, vol. 27, No. 5, 2003, pp. 412-418.

Dyer, J.R., et al, "Streptomycin. II. Streptose," Journal of the American Chemical Society, vol. 87, No. 3, Feb. 5, 1965, pp. 654-655.

Fatiadi, A.J., et al, "Cyclic Polyhydroxy Ketones II. xylo-Trihydroxycyclohexenediolic Acid and Keto-Inositols," Journal of (56) References Cited

OTHER PUBLICATIONS

Research of the National Bureau of Standards, Section A: Physics and Chemistry, vol. 68A, No. 3, May-Jun. 1964, pp. 287-299.
Goda, S.K., et al, "Neomycin Biosynthesis: The Incorporation of D-6-Deoxy-Glucose Derivatives and Variously Labelled Glucose into the 2-Deoxystreptamine Ring: Postulated Involvement of 2-Deoxyinosose Synthase in the Biosynthesis," The Journal of Antibiotics, vol. 45, No. 6, Jun. 1992, pp. 984-994.
Granville, A.M., et al, "Chemo-enzymatic Synthesis and RAFT Polymerization of 6-O-Methacryloyl Mannose: A Suitable Glycopolymer for Binding to the Tetrameric Lectin Concanavalin A?," Macromol. Symp., vol. 255, 2007, pp. 81-89.
Gross, P.H., et al., "Amino sugar synthesis. XVII. Synthesis of D-rhamnosamine and of 2,6-diamino-2,6-dideoxy-D-mannose from N-acetyl-D-mannosamine," Justus Liebigs Annalen der Chemie, vol. 691, 1966, pp. 198-204. (English Translation Not Available).
Gross, P.H., et al., "Amino sugar synthesis. XII. 2,6-Diamino-2,6-dideoxy-D-allose," Justus Liebigs Annalen der Chemie, vol. 683, 1965, pp. 179-182. (English Translation Not Available).
Gross, P.H., et al., "2,6-Diamino-2,6-dideoxy-D-mannose and D-rhamnosamine from D-glucosamine," Naturwissenschaften, vol. 52, No. 8, 1965, pp. 185.
Gross, P.H. et al., "Amino sugar syntheses. IX. Synthesis of 2,6-diamino-2,6-dideoxy-D-gulose by using an oxazolidone protective group," Justus Liebigs Annalen der Chemie, vol. 681, 1965, pp. 225-227. (English Translation Not Available).
Gross, P.H. et al., "2,6-Diamino-2,6-dideoxy-D-allose from glucosamine by use of an inversion with thionyl chloride," Die Naturwissenschaften, vol. 51, No. 21, 1964, pp. 509-510.
Gross, P.H. et al., "New oxazolidone synthesis and preparation of 2,6-diamino-2,6-dideoxy-D-gulose," Angewandte Chemie, vol. 76, No. 9, 1964, pp. 377. (English Translation Not Available).
Haskell, T.H., et al, "Paromomycin II. Paromobiosamine, A Diaminohexosyl-D-Ribose," Journal of the American Chemical Society, vol. 81, Jul. 5, 1959, pp. 3481.
Haskell, T.H., et al, "Paromomycin. I. Paromamine, a glycoside of D-glucosamine," Journal of the American Chemical Society, vol. 81, Jul. 5, 1959, pp. 3480-3481.
Haskell, T.H., et al, "The Configuration of Paromose," Journal of Organic Chemistry, vol. 28, Oct. 1963, pp. 2598-2604.
Horii, S., et al. "Separation of zygomycin A1 and zygomycin A2 and their degradation products," Takeda Kenkyusho Nenpo, vol. 23, 1964, pp. 8-17.
Huettenrauch, R. et al., "Detection of the primary cleavage products of paromomycin," Pharmazeutische Zentralhalle fuer Deutschland, vol. 104, No. 2, 1965, pp. 85-87. English Translation Not Available.
International Search Report and Written Opinion received for PCT/US2012/063261 dated Jan. 22, 2013, 11 pages.
International Search Report and Written Opinion received for PCT/US12/67765 dated Feb. 26, 2013.
Kadokawa, J., et al, "Synthesis of new aminopolysaccharides by polymerization of 6-amino-6-deoxy-D-glucose and 2,6-dideoxy-D-glucose," European Polymer Journal, vol. 36, 2000, pp. 225-230.
Kakinuma, K., et al, "Mechanism and Stereochemistry of the Biosynthesis of 2-Deoxystreptamine and Neosamine C," The Journal of Antibiotics, Jun. 1989, pp. 926-933.
Kakinuma, K., et al, "Sterochemistry of Ribostamycin Biosynthesis. An Application of 2H NMR Spectroscopy," Journal of American Chemical Society, vol. 103, No. 18, 1981, pp. 5614-5616.
Kakinuma, K., et al, "Transamination Stereochemistry in the Formation of Neosamine C of Ribostamycin," The Journal of Antibiotics, vol. 36, No. 6, Jun. 1983 pp. 749-750.
Kakinuma, K., et al, "Stereochemistry of ribostamycin biosynthesis studied by deuterium NMR spectroscopy," Tennen Yuki Kagobutsu Toronkai Koen Yoshishu, vol. 24, 1981, pp. 537-544. (English Abstract).
Kim, S. et al., "Design of new biomimetic glycopolymers for hepatocellular engineering," Proceedings of the International Symposium on Controlled Release of Bioactive Materials, 27th, 2000, pp. 638-639.

Komor, E. et al., "Sugar specificity and sugar-proton interaction for the hexose-proton-symport system of Chlorella," European Journal of Biochemistry, vol. 146, 1985, pp. 649-656.
Konishi, M. et al., "Aminoglycoside antibiotics. VI. Structure determination of 4'-deoxybutirosins (Bu-1975C1 and C2)," The Journal of Antibiotics, vol. 27, No. 6, Jun. 1974, pp. 471-483.
Koster, H. et al., "Physiology and biochemistry of streptomycetes. XI. Different incorporation of D-glucose-u-14C into the paromomycin isomers and the precursors of paromomycin I," Zeitschrift fuer Allgemeine Mikrobiologie, vol. 17, No. 6, 1977, pp. 433-436. English Abstract Only.
Krul, L.P. et al., "Water-Soluble Polymers of Acrylamide as Labeling Adhesives," Russian Journal of applied Chemistry, vol. 78, No. 5, 2005, pp. 856-859. . No English Translation Available.
Kurita, K. et al., "Synthetic polymers containing sugar residues, 8. Novel polyureas from 2,6-diamino-2,6-dideoxy-d-gulose and diisocyanates," Die Makromolekulare Chemie, vol. 187, Jun. 1986, pp. 1359-1365. No English Translation Available.
Kuzyaeva, V.A., "Degradation products of colimycin, mycerin, and neomycin," Antibiotiki (Moscow), vol. 9, No. 9, 1964, pp. 784-788.
Liebermann, B. et al., "Physiology and biochemistry of Streptomycetes. 12. Different uptake and utilization of radioactive-labeled dendrolites of paromomycin by *Streptomyces albus* var. *metamycinus novus var*," Pharmazie, vol. 32, May 1977, pp. 293-295.
Lodhi, S., et al, "Interactions of Neomycin and Calcium in Synaptosomal Membranes and Polyphosphoinositide Monolayers," Biochimica et Biophysica Acta, vol. 426, 1976, pp. 781-785.
Ludowieg, J.J., et al, "A Method for Analysis of Amino Sugars: Specificity and Mechanism of the Reaction," Carbohydrate Research, vol. 8, 1968, pp. 185-192.
Meyer Zu Reckendorf, W. et al., "Di- und polyaminozucker, XIX N-(2.4-dinitrophenyl)-derivate von diamino-didesoxy-hexosen," Tetrahedron Letters, vol. 13, No. 33, 1972, pp. 3461-3464. (English Translation Not Available).
Meyer Zu Reckendorf, W. et al., "Diamino sugars. VII. New syntheses of 2,6-diamino-2,6-dideoxy-D-allose," Chemische Berichte, vol. 101, No. 7, 1968, pp. 2289-2293. (English Translation Not Available).
Meyer Zu Reckendorf, W. "Diaminosugars—IV. The Synthesis of 2,6-diamino-2,6-Dideoxy-L-Idose," Tetrahedron, vol. 19, 1963, pp. 2033-2038.
Meyer Zu Reckendorf, W., "2,6-Diamino-2,6-dideoxy-β-D-mannose. From methyl 2-benzamido-4,6-O-benzylidene-2-deoxy-α-Daltropyranoside by inversion at C-3 via neighboring group participation," Methods in Carbohydrate Chemistry, vol. 6, 1972, pp. 274-276.
Meyer Zu Reckendorf, W., "2,6-Diamino-2,6-dideoxy-α-D-galactose. From methyl 2,6-bis(benzamido)-2,6-dideoxy-3-O-methyl-4-Omethylsulfonyl-β-D-glucopyranoside by inversion at C-4 via neighboring group participation," Methods in Carbohydrate Chemistry, vol. 6, 1972, pp. 270-273.
Meyer Zu Reckendorf, W., et al, "A large-scale synthesis of 2,6-diamino-2,6-dideoxy-D-glucose," Carbohydrate Research, vol. 45, 1975, pp. 307-311.
Meyer Zu Reckendorf, W., "Synthesis of 2,6-diamino-2,5-dideoxy-β-D-mannose. A derivative of 2,6-imino-2,6-dideoxy-α-D-altrose," Chemische Berichte, vol. 98, No. 1, 1965, pp. 93-97. (English Translation Not Available).
Meyer Zu Reckendorf, W., "Diamino sugars. V. Synthesis of 2,3-diamino-2,3-dideoxy-D-allose, 2,3-diamino-2,3-dideoxy-α-D-glucose, and 2,6-diamino-2,6-dideoxy-α-D-allose," Chemische Berichte, vol. 97, No. 5, 1964, pp. 1275-1285. (English Translation Not Available).
Meyer Zu Reckendorf, W., "Diamino sugars. II. Synthesis of 2,6-diamino-2,6-dideoxy-D-galactose," Chemische Berichte, vol. 96, No. 8, 1963, pp. 2019-2023. (English Translation Not Available).
Meyer Zu Reckendorf, W., "Synthesis of 2,6-diamino-2,6-dideoxy-L-idose," Angewandte Chemie, vol. 75, 1963, pp. 573. (English Translation Not Available).
Meyer Zu Reckendorf, W., " Diamino sugars. I. A simple synthesis of 2,6-diamino-2,6-dideoxy-β-D-glucose," Chemische Berichte, vol. 96, 1963, pp. 2017-2018. (English Translation Not Available).

(56) References Cited

OTHER PUBLICATIONS

Meyer Zu Reckendorf, W. et al., "Di- und Polyaminozucker, XVIII Synthesen der 2.4-Diamino-2.4-didesoxy-D-galaktose und -D-glucose," Chemische Berichte, vol. 105, 1972, pp. 2998-3014. (English Translation Not Available).

Miyake, A. et al., "Zygomycins, antibiotic substances produced by *Streptomyces pulveraceus*," Takeda Kenkyusho Nenpo, vol. 23, 1964, pp. 209-236.

Morris, J.C., et al, "Role of 2,6-Dideoxy-2,6-diaminoglucose in Activation of a Eukaryotic Phospholipase C by Aminoglycoside Antibiotics," The Journal of Biological Chemistry, vol. 272, No. 47, Nov. 21, 1997, pp. 29554-29559.

Nakanishi, G. et al., "Thermosetting Adhesive Based on Tannin and Poly(NHydroxymethyl Acrylamide," The Journal of Adhesion, vol. 84, No. 7, 2008, pp. 638-652.

Ogawa, S., et al, "Chemistry of the Neomycins. XIII. Synthesis of Aminocyclitols and Amino Sugars via Nitromethane Condensations," Journal of Organic Chemistry, vol. 39, No. 6, 1974, pp. 812-821.

Ohnsmann, J., "Selective deblockable 2,6-diamino-2,6-didesoxy-D-glucose-Scaffolds for the combinatorial synthesis of potential RNA ligands," Dissertation, Oct. 9, 2006, 244 pgs. (English Abstract Only).

Onodera, K., et al, "The Amadori Rearrangement Product as an Intermediate in the Browning Reaction—Part I. Preparation and Infrared Spectra of 1-Amino-1-deoxy-D-fructoses and 1-Glycino-1-deoxy-D-tagatose," Bull. Agr. Chem. Soc. Japan, vol. 24, No. 7, 1960, pp. 703-710.

Petrie, E.M., "Biodegradable Polymers in Adhesive Systems," ASI, Jun. 1, 2007, Retieved from the internet http://www.adhesivesmag.com/articles/print/biodegradable-polymers-in-adhesive-systems, Printed on Mar. 20, 2013, 8 pages.

Rai, U.S., et al, "Effect of polyacrylamide on the different properties of cement and mortar," Materials Science and Engineering: A, vol. 392, 2005, pp. 42-50.

Rinehart, K.L., et al, "Chemistry of the Neomycins. IV. Isolation of Neosamines B and C. Stereochemistry of Neobiosamine C," Journal of the American Chemical Society, vol. 80, Dec. 5, 1958, pp. 6461-6462.

Rinehart, K. L., et al, "Chemistry of the Neomycins. V. Differentiation of the Neomycin Complex. Identity of Framycetin and Neomycin B. Compounds Obtained from Methyl Neobiosaminide B," Journal of the American Chemical Society, vol. 82, Aug. 5, 1960, pp. 3938-3946.

Rinehart, K. L., et al, "Chemistry of the Neomycins. VI. Structure of Neobiosamine B," Journal of the American Chemistry Society, vol. 82, Jun. 5, 1960, pp. 2970-2971.

Rinehart, K. L., et al, "Chemistry of the Neomycins. VII. Compounds Obtained from Methyl Neobiosaminide C," Journal of the American Chemical Society, vol. 83, Feb. 5, 1961, pp. 643-648.

Rinehart, K. L., et al, "Identity of Neosamine C, "Diaminohexose II" From Zygomycin A, and 2,6-Diamino-2,6-Dideoxy-D-Glucose," Journal of the American Chemical Society, vol. 83, Jul. 5, 1961, pp. 2964-2965.

Rinehart, K. L., et al, "Biogenesis of the neomycins," Antimicrobial Agents and Chemotherapy 1961-1970, 1962, 1961, pp. 268-273.

Rodger, S.L., et al, "High Strength Cement Pastes," Journal of Materials Science, vol. 20, Aug. 1985, pp. 2853-2860.

Satoh, C., et al, "Studies on the Optical Rotatory Dispersion of Carbohydrate C-Nitroalcohols," Chemical & Pharmaceutical Bulletin, vol. 12, No. 4, 1964, pp. 518-520.

Sharples, A., "Structure and behavior of reverse osmosis membranes," Chemical Engineer (Rugby, United Kingdom), vol. 1, No. 257, 1972, pp. 34-37.

Smirnov, P.M., "The transformation of nitrogen compounds in peat-ammonium and peat-mineral fertilizers and the efficacy of these fertilizers," Izvestiya Timiryazevskoi Sel'skokhozyaistvennoi Akademii, vol. 6, 1964, pp. 72-85. (No English Translation Available).

Smith, L.V., "Synthesis of 2,6-diamino-2,6-dideoxy-D-galactose," 1967, 59 pages.

Smith, L.V., et al., "Amino sugar syntheses. X. Derivatives of benzyl 2-[(benzyloxycarbonyl)amino]-2-deoxy-3B1-Dgalactosiduronic acid and synthesis of 2,6-diamino-2,6-dideoxy-D-galactose," Justus Liebigs Annalen der Chemie, vol. 681, 1965, pp. 228-231. (English Translation Not Available).

Tanasescu, I. et al., "Photochemical reactions in the derivatives of o-nitrobenzylidene acetals. XIX. o-Nitrobenzylidene-myoinositol," Acad. Rep. Populare Romine, Filiala Cluj, Studii Cercetari Chim., vol. 13, No. 1, 1962, pp. 69-75.

Tsuji, K., et al, "Co-Irradiation as an Alternate Method for Sterilization of Penicillin G, Neomycin, Novobiocin, and Dihydrostreptomycin," Journal of Pharmaceutical Sciences, vol. 72, No. 1, Jan. 1983, pp. 23-26.

Tsunakawa, M., et al, "Inosamycin, A Complex of New Aminoglycoside Antibiotics. II. Structure Determination," Journal of Antibiotics, vol. 38, No. 10, Oct. 1985, pp. 1313-1321.

Usui, T., et al, "Synthesis of 3-O-Acetyl-2,6-Diazido-4-O-Benzyl-2,6-Dideoxy-L-Idopyranosyl Chloride, A Glycosyl Halide for the Synthesis of Neomycin B," Carbohydrate Research, vol. 130, 1984, pp. 165-177.

Valeriote, F.A., et al, "A Model for the Action of Vinblastine In Vivo," Biophysical Journal, vol. 6, 1966, pp. 145-152.

Weidmann, H., et al., "Derivatives of 2-amino-2-deoxy-D-glucopyranose. III. 2-Amino-3,4,6-tri-O-benzoyl-2-deoxy-1-thio-β-Dglucopyranosides," Justus Liebigs Annalen der Chemie, vol. 628, No. 1/3, 1959, pp. 255-256. (No English Translation Available).

Weidmann, H., et al., "Configuration of 2,6-diamino-2,6-dideoxyhexopyranose from neomycin C," Justus Liebigs Annalen der Chemie, vol. 644, 1961, pp. 127-129. (No English Translation Available).

Weidmann, H., et al., "Amino sugar syntheses. III Synthesis of 2,6-diamino-2,6-dideoxy-D-glucopyranose," Justus Liebigs Annalen der Chemie, vol. 641, 1961, pp. 138-142. (No English Translation Available).

Weidmann, H., et al., "Amino sugar syntheses. II. Benzyl 2,6-diamino-2,6-dideoxy-α-D-glucopyranoside," Justus Liebigs Annalen der Chemie, vol. 641, 1961, pp. 132-137. (No English Translation Available).

Weidmann, H., et al., "Synthesis of 2,6-diamino-2,6-dideoxy-D-glucose," Angewandte Chemie, vol. 72, 1960, pp. 750. (No English Translation Available).

Wolfrom, M. L., et al, "2,6-Diamino-2,6-dideoxy-D-mannose Dihydrochloride," Chemical Communications, No. 8, 1965, pp. 143-144.

Wolfrom, M. L., et al, "Amino Derivatives of Starches. 2,6-Diamino-2,6-dideoxy-D-mannose Dihydrochloride," Journal of Organic Chemistry, vol. 30, Aug. 1965, pp. 2728-2731.

Wolfrom, M. L., et al, "Methyl 2-Deoxy-2-sulfoamino-β-D-glucopyranoside Trisulfate and the Preparation of Tri-O-acetyl-2-amino-2-deoxy-(-D-glucopyranosyl Bromide," Journal of Organic Chemistry, vol. 26, Jun. 1961, pp. 2145-2146.

Wolfrom, M. L., et al, "Synthesis of Amino Sugars by Reduction of Hydrazine Derivatives; D- and L-Ribosamine, D-Lyxosamine," Journal of the American Chemical Society, Jul. 20, 1959, vol. 81, pp. 3716-3719.

Zaidi, S. et al., "Preparation and determination of iron sucrate," Pakistan Journal of scientific and Industrial Research, vol. 6, 1963, pp. 114-115.

"Aginsky Consulting Group," Cosmetics Market Research Summary, Oct. 2007, pp. 1-8.

"COGNIS," accessed at https://web.archive.org/web/20120502131818/http://www.cognis.com/company/, accessed on Sep. 10, 2014, p. 1.

"Helicopter Dust and Helipad Dust Control," accessed at http://www.midwestind.com/project/helicopter-dust/, accessed on Apr. 1, 2015, pp. 1-4.

Bahulekar, R. et al., "Polyacrylamides containing sugar residues: synthesis, characterization and hepatocyte attachment studies," Biotechnology Techniques, Oct. 1998, vol. 12, No. 10, pp. 721-724.

(56) References Cited

OTHER PUBLICATIONS

Bokhari, M., et al., "Emulsion-templated porous polymers as scaffolds for three dimensional cell culture: effect of synthesis parameters on scaffold formation and homogeneity," J. Mater. Chem., vol. 17, 2007, pp. 4088-4094.
Cameron, N. R., "High internal phase emulsion templating as a route to well-defined porous polymers," Polymer, vol. 46, Issue 5, Feb. 14, 2005, pp. 1439-1449.
Chalker-Scott, Linda, "The Myth of Polyacrylamide Hydrogels: Polyacrylamide hydrogels are environmentally safe substances that reduce irrigation needs," 2 pp., downloaded May 9, 2013 from http://www.theinformedgardener.com.
CID11032184—Compound Summary, Pub Chem Compound, NCBI, downloaded Apr. 2, 2013 from http://pubchem.ncbi.nlm.nih.gov/summary/summary.cgi?cid=11032184&loc=ec_res, pp. 1-3.
European Commission "Opinion of the Scientific Committee on Cosmetic Products and Non-Food Products intended for Consumers concerning Acrylamide Residues in Cosmetics adopted by the plenary session of the SCCNFP of Sep. 30, 1999," accessed at https://web.archive.org/web/20120927233056/http://ec.europa.eu/health/scientific_committees/consumer_safety/opinions/sccnfp_opinions_97_04/sccp_out95_en.htm, accessed on Sep. 10, 2014, 2 pages.
Fanta, G.F. et al., "Graft Polymerization of Acrylamide and 2-Acrylamido-2-methylpropanesulfonic Acid," Journal of Applied Polymer Science, vol. 24, Issue 9, Nov. 1, 1979, pp. 2015-2023.
FDA "Part 172—Food Additives Permitted for Direct Addition to Food for Human Consumption—Subpart C—Coatings, Films and Related Substances, Sec. 172.255 Polyacrylamide," Code of Federal Regulations, Tital 21, vol. 8, accessed at https://web.archive.org/web/20100226140038/http://www.accessdata.fda.gov/scripts/cdrh/cfdocs/cfcfr/CFRSearch.cfm?fr=172.255&SearchTerm=polyacrylamide, Apr. 1, 2009, p. 1.
FDA "Part 872—Dental Devices, Subpart D—Prosthetic Devices, Sec. 872.3480 Polyacrylamide polymer (modified cationic) denture adhesive" Code of Federal Regulations, Title 21, vol. 8, accessed at https://web.archive.org/web/20100226140355/http://www.accessdata.fda.gov/scripts/cdrh/cfdocs/cfcfr/CFRSearch.cfm?fr=872.3480&SearchTerm=polyacrylamide, Apr. 1, 2009, p. 1.
Final Office Action received for U.S. Appl. No. 13/879,976 dated Oct. 23, 2014.
Hill, et al., "Carbohydrate Protein Conjugates (CPC): The Design of New Materials to Stabilize Enzymes," Mat. Res. Symp. Proc., vol. 218, 1991, pp. 7-15.
International Search Report and Written Opinion for Intl. Pat. Appln. No. PCT/US2012/063240, mailed on Jan. 22, 2013.
International Search Report and Written Opinion for PCT/US12/63211, mailed on Mar. 15, 2013.
International Search Report and Written Opinion received for PCT/US2012/067782 mailed Feb. 5, 2013.
Ivirico, J. L., et al., "Proliferation and differentiation of goat bone marrow stromal cells in 3D scaffolds with tunable hydrophilicity," Journal of Biomedical Materials Research, Part B: Applied Biomaterials, vol. 91, No. 1, 2009, pp. 277-286.
Moitessier, N., et al., "Orthogonally protected carbohydrate-based scaffolds," Tetrahedron Letters, vol. 46, Issue 37, Sep. 12, 2005, pp. 6191-6194.
Moshfeghian, A., et al., "Characterization of emulsified chitosan-PLGA matrixes formed using controlled-rate freezing and lyophilization technique," Journal of Biomedical Materials Research, Part A, vol. 79, No. 2, 2006, pp. 418-430.
Narayani, R., et al., "Collagen-poly (HEMA) hydrogels for the controlled delivery of methotrexate and cisplatin," International Journal of Pharmaceutics, vol. 138, 1996, pp. 121-124.
Non-Final Office Action in U.S. Appl. No. 13/879,976 dtd Jan. 30, 2015.
Non-final Office Action received for U.S. Appl. No. 13/879,976 dated Jul. 8, 2014.
Non-final Office Action received for U.S. Appl. No. 13/980,535 dated Apr. 8, 2015.
Paterson, et al., "Carbohydrate-Based Crosslinking Agents: Potential Use in Hydrogels," Journal of Polymer Science Part A: Polymer Chemistry 2011, vol. 49, pp. 4312-4315.
Reti, Adrian R., et al., "Development of Urea-Based and Latex Emulsion Systems for Dust Control in Support of Military Operations," Jan. 1967, Pentagon Reports, Contract Report No. 3-172, Project No. 1-V-0-21701-A-046, Task 5, 70 pp.
Rushing, John F. et al., "Evaluation of Dust Palliatives for Unpaved Roads in Arid Climates," Aug. 2006, J. Pert Constr. Fac., pp. 281-286.
Storm Water Management Fact Sheet Dust Control, Environmental Protection Agency, Sep. 1999, EPA 832-F-99-003, 5 pp.
Suo, A., et al., "Synthesis and properties of carboxymethyl cellulose-graft-poly(acrylic acid-co-acrylamide) as a novel cellulose-based superabsorbent," Journal of Applied Polymer Science, vol. 103, Issue 3, Feb. 5, 2007, pp. 1382-1388.
Tingle, J. S., et al., "Evaluation of Expedient Methods for Mitigating Dust on Helipads," Dust Abatement Project, 2004, Final Report, ERDC/GSL TR-04-XX U.S. Army Corps of Engineers, 89 pp.
U.S. Environmental Protection Agency, "Chemical Summary for Acrylamide," prepared by Office of Pollution Prevention and Toxics, Sep. 1994, EPA 749-F-94-005a, 13 pages.
United States Department of Agriculture, Grain Inspection, Packers and Stockyards Administration, "2008 Annual Report of the Federal Grain Inspection Service," 57 pp.
Wang, Y., et al., "Fabrication and characterization of a PAM modified PHBV/BG scaffold," Chinese Science Bulletin, vol. 54, No. 17, 2009, pp. 2940-2946.
Yang, Y., et al., "Electrospun Composite Mats of Poly[(D,L-lactide)-co-glycolide] and Collagen with High Porosity as Potential Scaffolds for Skin Tissue Engineering," Macromolecular Materials and Engineering, vol. 294, No. 9, 2009, pp. 611-619.
Yu, Kai, et al., "Synthesis of Functional Polymer Brushes Containing Carbohydrate Residues in the hPyranose Form and Their Specific and Nonspecific Interactions with Proteins," 2010, Biomacromolecules, vol. 11, pp. 3073-3085.
Zhang, Y. et al., "Stimuli-responsive copolymers of n-isopropyl acrylamide with enhanced longevity in water for micro-and nanofluidics, drug delivery and non-woven applications," 2009, J. Mater. Chem. 19, pp. 4732-4739.
Badey et al., "Radically initiated polymerization of a methacryloylamido-terminated saccharide, 1, Monomer synthesis, homopolymerization and characterizations", Macromolecular Chemistry and Physics, 1996, vol. 197, p. 3711-3728.
Badey et al., "Radically initiated polymerization of a methacryloylamido-terminated saccharide, $2^{a)}$, Copolymerization with 2-hydroxyethyl methacrylate", Macromolecular Chemistry and Physics, 1997, vol. 198, p. 945-957.

* cited by examiner

CEMENT SLURRIES HAVING PYRANOSE POLYMERS

CROSS-REFERENCE TO RELATED APPLICATIONS

This U.S. patent application claims the benefit of priority to International Application No. PCT/US2012/063261, filed on Nov. 2, 2012, the entire contents of which are incorporated herein by reference for any and all purposes.

TECHNICAL FIELD

The technology relates compositions and methods for altering a cement mixture, and, more particularly, to altering one or more properties of a cement mixture using a pyranose polymer.

BACKGROUND

Concrete is a hard composite of calcium sulfate, calcium aluminate, calcium silicate, lime, grit, and aggregates such as crushed rock and sand. Water is mixed with the concrete to form a slurry. Often the slurry has very poor flow properties. To alleviate this, additives are included in the slurry to improve flow and to adjust surface tension. Such additives are commonly called plasticizers, super plasticizers, or surfactants.

In a concrete formulation, the calcium substances react with water to form a cured, solid material. The cured concrete often has little flex to it. High molecular weight polymers may be added to concrete formulations to improve the flexibility of the cured concrete. Such polymer-modified concrete is often used in airport runways. The pounding of heavy aircraft landing can crack normal concrete due to the inflexible nature of the substance. However, with polymer additives the concrete flexes and gives the runway greater longevity.

There are many problems with current polymeric concrete additives. Generally, the additives used are not environmentally friendly (i.e. "green") and may release toxic substances. For example, the concrete additive polyacrylamide is not biodegradable and persists in the environment. In addition, the acrylamide monomer is liberated from the polymer. The acrylamide monomer is a suspected carcinogen and has encountered increasing regulations. Polyacrylamide is further plagued by the fact that the nitrogen and carbonyl can chelate metals. The ionic strength of a mixture thus greatly impacts polyacrylamide, as polyacrylamide is capable of absorbing up to 1000 times its weight in distilled water, yet absorbs only 50 times its weight in 3% saline solution. Concrete plasticizers and surfactants are often based upon ethylene glycol, which may be released as a toxic material upon degradation. Current concrete polymers may also release their monomer constituents, which can act as neurotoxins, mutagens, teratogens, and can harm human and animal reproductive systems.

SUMMARY

In one aspect, a composition is provided that includes a cement component and an amidyl pyranose component. In some embodiments, the cement component is Portland cement, a calcium sulfate, a calcium aluminate, lime or grit. In some embodiments, the amidyl pyranose component is in an aqueous solution. In some embodiments, the amidyl pyranose component solution is about 20% by weight amidyl pyranose polymer. In many embodiments, the amidyl pyranose component includes an acrylamide pyranose polymer. In many embodiments, the amidyl pyranose component includes a styrenyl benzamide pyranose polymer. In some embodiments, the amidyl pyranose polymer further includes a repeat unit that includes a cross-linking moiety. In some embodiments, the amidyl pyranose polymer further includes a repeat unit that includes a non-pyranose acrylamide moiety. In many embodiments, the composition further includes an aggregate component. In some embodiments, the aggregate component is sand, crushed rock or crushed stone. In many embodiments, the composition further includes water.

In another aspect, a method is provided that includes combining an amidyl pyranose component with a cement component to form a modified cement mixture. In many embodiments, the method further includes combining an aggregate component. In many embodiments, the method further includes combining an aqueous component. In some embodiments, the cement component is Portland cement, a calcium sulfate, a calcium aluminate, lime or grit. In some embodiments, the aggregate component is sand, crushed rock or crushed stone. In some embodiments, the amidyl pyranose component is in an aqueous solution. In some embodiments, the aqueous amidyl pyranose component is about 20% by weight amidyl pyranose polymer. In many embodiments, the amidyl pyranose component includes an acrylamide pyranose polymer. In many embodiments, the amidyl pyranose component includes a styrenyl benzamide pyranose polymer. In some embodiments, the amidyl pyranose polymer further includes a repeat unit that includes a cross-linking moiety. In some embodiments, the amidyl pyranose polymer further includes a repeat unit that includes a non-pyranose acrylamide moiety.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Compositions and methods are provided for altering cement mixtures, and, more particularly, altering the flow and/or mechanical properties of such cement mixtures. In particular, amidyl pyranose monomers and/or polymers are useful for providing such alteration of the cement mixtures.

In one aspect, a composition is provided that includes a cement component and an amidyl pyranose component. The amidyl pyranose component is adapted to alter at least one of a flow property of the cement mixture and a mechanical property of a concrete produced by the cement mixture. The amidyl pyranose components improve the mechanical properties of the resulting concrete and improve flow properties of concrete slurries. The flow property can include elasticity, plasticity, flexibility and/or how the cement flows. The mechanical property can include surface tension, compressive strength, flexibility and/or tensile strength.

Illustrative cement components may include, but are not limited to, Portland cement, a calcium sulfate, a calcium aluminate, lime or grit. Illustrative amidyl pyranose components may include amidyl pyranose monomers or polymers thereof, and they may be formed as an aqueous solution. In some embodiments, the aqueous amidyl pyranose component solution is about 20% by weight amidyl pyranose polymer in water. Upon degradation, such amidyl pyranose polymers release non-toxic sugar moieties, and are therefore far more "green" than current state of the art technologies.

The compositions may also include water and/or an aggregate component. Illustrative aggregate components include, but are not limited to, sand, crushed rock or crushed stone.

In any of the above embodiments, the amidyl pyranose polymer may be blended with water before mixing with the cement-aggregate mixture. The volume of water for the particular mixture is determined and a container filled with that volume. Amidyl pyranose polymer is then added to the water, rather than adding water to the amidyl pyranose polymer which can cause foaming and decrease the polymer-concrete properties. In certain embodiments that include an aqueous amidyl pyranose component, the aqueous amidyl pyranose component is about 20% by weight of the amidyl pyranose polymer.

In another aspect, a method is provided that includes combining an amidyl pyranose component with a cement component to form a modified cement mixture. In many embodiments, the method further includes combining an aggregate component. In many embodiments, the method further includes combining an aqueous component. In some embodiments, the cement component is Portland cement, a calcium sulfate, a calcium aluminate, lime or grit. In some embodiments, the aggregate component is sand, crushed rock or crushed stone. In some embodiments, the amidyl pyranose component is in an aqueous solution. In some embodiments, the amidyl pyranose component includes an amidyl pyranose polymer. In some embodiments, the aqueous amidyl pyranose component solution is about 20% by weight amidyl pyranose polymer solution.

With regard to polymers, while acrylamides, acrylates and other acrylics are related, polymerization is initiated and inhibited differently between the groups. One difference between acrylamides and acrylates is that oxygen does not inhibit polymerization for acrylamides while oxygen does inhibit polymerization of acrylates. This means that monomers of acrylamides may be added to concrete and then polymerized later, while the methacrylates must be polymerized prior to addition to the concrete.

Different amidyl pyranose polymer types are used to tune the properties of the additive. Acrylamide pyranose polymers possess lower glass transition temperatures, while methacrylamide pyranose polymers have higher glass transition temperatures. Styrenyl benzamide pyranose polymers have greater impact resistance while acrylamide pyranose polymers are more hydrophilic. Some embodiments described are super plasticizers and polymers that enhance mechanical properties of concrete and/or flow properties of slurries while being unaffected by ionic strength and/or being environmentally "green." The amidyl pyranose polymers are not impacted by the chelating problems that plague polyacrylamide. In addition, the amidyl pyranose polymers possess pendent pyranose moieties that are not carcinogenic.

The structure of amino pyranose has multiple possible stereo isomers. Some common structures are amino-D-glucose, amino-D-mannose, and amino-galactose. These amino pyranoses are monoamines for thermoplastics or diamines for thermosetting resins. The amino moieties are not limited to any particular positions on the pyranose, therefore 1,2-, 1,3-, and/or 1,4-diamino pyranoses may be used in the cement compositions and methods.

Aldose- and ketose-containing structural units have high solubility in aqueous media, regardless of their form. The sugar-containing structures are non-ionic and, thus, are not as affected by high ionic strength aqueous solutions. Unlike acrylic acid or other ionic type polymers, calcium and other metal ions do not crosslink the amidyl pyranose containing polymers. Elimination of the metal ion crosslinking leads to fewer gelation risks, and enhances the ability of the amidyl pyranose polymers to improve the mechanical properties of the concrete. The amidyl pyranose structural units are also less impacted by the presence of ions and thus improve flow properties of the concrete slurries even in high ionic strength situations.

In many embodiments of the above aspects, the amidyl pyranose additive includes an acrylamide pyranose polymer with a repeat unit represented according to Formula I.

In Formula I, each $R_1$ is individually H, cyano, or $C_1$-$C_8$ alkyl. In some embodiments including Formula I, each $R_1$ is individually H, cyano, methyl, ethyl, propyl, isopropyl, n-butyl, sec-butyl, tert-butyl, n-pentyl, n-hexyl, n-heptyl, n-octyl,

2-ethylhexyl, or isomers thereof. In some embodiments, each $R_1$ is individually H or methyl.

In many embodiments, the amidyl pyranose additive includes a styrenyl benzamide pyranose polymer according to Formula II.

(II)

In Formula II, each $R_1$ is individually H, cyano, or $C_1$-$C_8$ alkyl. In some embodiments including Formula I or II, or both, each $R_1$ is individually H, cyano, methyl, ethyl, propyl, isopropyl, n-butyl, sec-butyl, tert-butyl, n-pentyl, n-hexyl, n-heptyl, n-octyl, 2-ethylhexyl, or isomers thereof. In some embodiments, each $R_1$ is individually H or methyl.

In some embodiments, the amidyl pyranose polymer also includes a repeat unit that includes a cross-linking moiety represented by Formula III.

(III)

In Formula III, each $R_1$ is individually H, cyano, or $C_1$-$C_8$ alkyl. In some embodiments including Formula III, each $R_1$ is individually H, cyano, methyl, ethyl, propyl, isopropyl, n-butyl, sec-butyl, tert-butyl, n-pentyl, n-hexyl, n-heptyl, n-octyl, 2-ethylhexyl, or isomers thereof. In some embodiments including Formula III, each $R_1$ is individually H or methyl.

In some embodiments, the amidyl pyranose polymer also includes a repeat unit that includes a cross-linking moiety represented by Formula IV.

(IV)

In Formula IV, each $R_1$ is individually H, cyano, or $C_1$-$C_8$ alkyl. In some embodiments including Formula IV, each $R_1$ is individually H, cyano, methyl, ethyl, propyl, isopropyl, n-butyl, sec-butyl, tert-butyl, n-pentyl, n-hexyl, n-heptyl, n-octyl, 2-ethylhexyl, or isomers thereof. In some embodiments including Formula IV, each $R_1$ is individually H or methyl.

In some embodiments, the amidyl pyranose polymer also includes a repeat unit that includes a non-pyranose acrylamide moiety represented by Formula V.

(V)

In Formula V, $R_2$ is $C_1$-$C_8$ alkyl, $C_1$-$C_8$ heteroalkyl, $OR_3$, or $NR_4R_5$, $R_3$ is $C_1$-$C_8$ alkyl or poly(alkylene glycol), and $R_4$ and $R_5$ are each independently H, $C_1$-$C_8$ alkyl, or $C_1$-$C_8$ heteroalkyl. In some embodiments, $R_2$ is a poly(alkylene glycol). In certain embodiments, the poly(alkylene glycol) is poly(ethylene glycol) or poly(propylene glycol). In certain embodiments, $R_2$ is a nitrogen-bound taurine or a salt thereof.

In some embodiments, the amidyl pyranose polymer also has a repeat unit that includes a non-pyranose acrylamide moiety represented by Formula VI.

(VI)

In Formula VI, $R_2$ is $C_1$-$C_8$ alkyl, $C_1$-$C_8$ heteroalkyl, $OR_3$, or $NR_4R_5$, $R_3$ is $C_1$-$C_8$ alkyl or poly(alkylene glycol), and $R_4$ and $R_5$ are each independently H, $C_1$-$C_8$ alkyl, or $C_1$-$C_8$ heteroalkyl. In some embodiments, $R_2$ is a poly(alkylene glycol). In certain embodiments, the poly(alkylene glycol) is poly(ethylene glycol) or poly(propylene glycol). In certain embodiments, $R_2$ is a nitrogen-bound taurine or a salt thereof.

In general, amidyl pyranose polymers are made by reacting an amine and an acid chloride. Sometimes the amine is on the pyranose unit and is protected as the hydrochloride. The acid chloride is a polymerizable functional unit such as acryloyl chloride. There is generally no need to protect the hydroxyl units on the pyran ring, as the amino moieties are generally much more reactive than hydroxyl moieties and so the coupling occurs with the amino groups exclusively. Hydroxyl moieties react only by the use of improper techniques such as a using a large amount of acid chloride.

The present technology, thus generally described, will be understood more readily by reference to the following examples, which are provided by way of illustration and are not intended to be limiting of the present technology.

EXAMPLES

The following non-limiting examples depict the synthesis and generation of certain embodiments of the current technology.

Example 1

Figure 1:
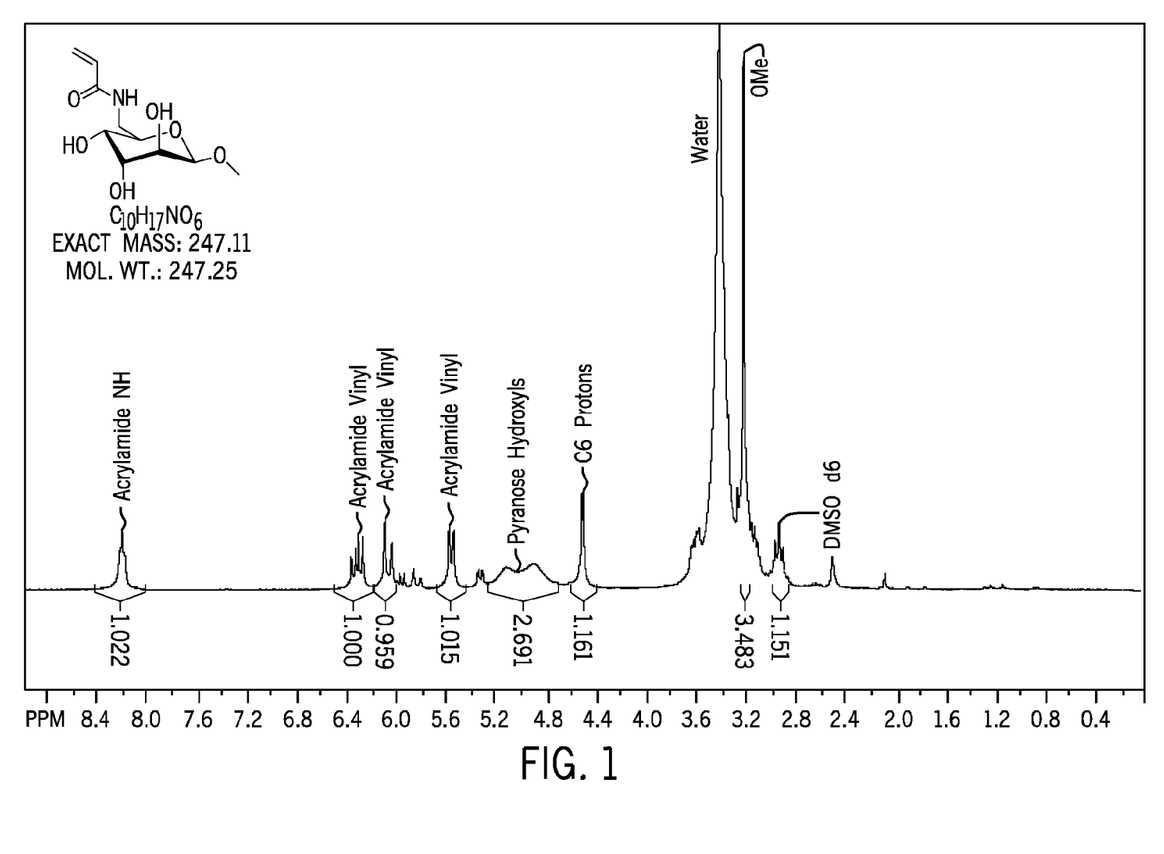
FIG. 1. 1H NMR of the N-(1-methyl-6-deoxy-D-glucose)-acrylamide.

Synthesis of N-(1-methyl-6-deoxy-D-glucose)-acrylamide. To a 1 L beaker was added 100 mL of deionized water. To the deionized water was added 11.000 g (103.790 mmol) of sodium carbonate. The sodium carbonate was allowed to dissolve into the water which took approximately an hour and a half. Once the sodium carbonate dissolved the beaker was placed into an ice bath and cooled to 0-2° C. To the cooled acetone/pyridine solution was added 11.000 g (40.130 mmol) of 1-methyl-6-deoxy-6-ammonium bromide-D-glucose and the compound was allowed to dissolve with very slow stirring. To a separate 250 mL beaker was added 100 mL hexanes. To the hexanes was added 3.65 mL of acryloyl chloride and the two mixed together. This solution was added dropwise to the water solution to generate a biphasic system. This biphasic reaction system was stirred slowly overnight. The contents of the beaker were then poured into a separatory funnel, the layers allowed to separate, and the water layer was added to a round bottom flask. The water was then removed using rotary evaporation. Acetone was added to the solid contents and then rotary evaporated. Ethanol was added to the solid material, dissolving the organics while the inorganic materials did not dissolve. The ethanol was filtered to remove the insoluble inorganic materials followed by removal of the ethanol by rotary evaporation. The solid contents were then recrystallized from methanol/acetone to yield 12.987 g of material or 131% of the theoretical yield. The reason for the excess is due to leftover water and bromide in the material. The 1H NMR of the N-(1-methyl-6-deoxy-D-glucose)-acrylamide product is shown in FIG. 1.

Example 2

Figure 2:
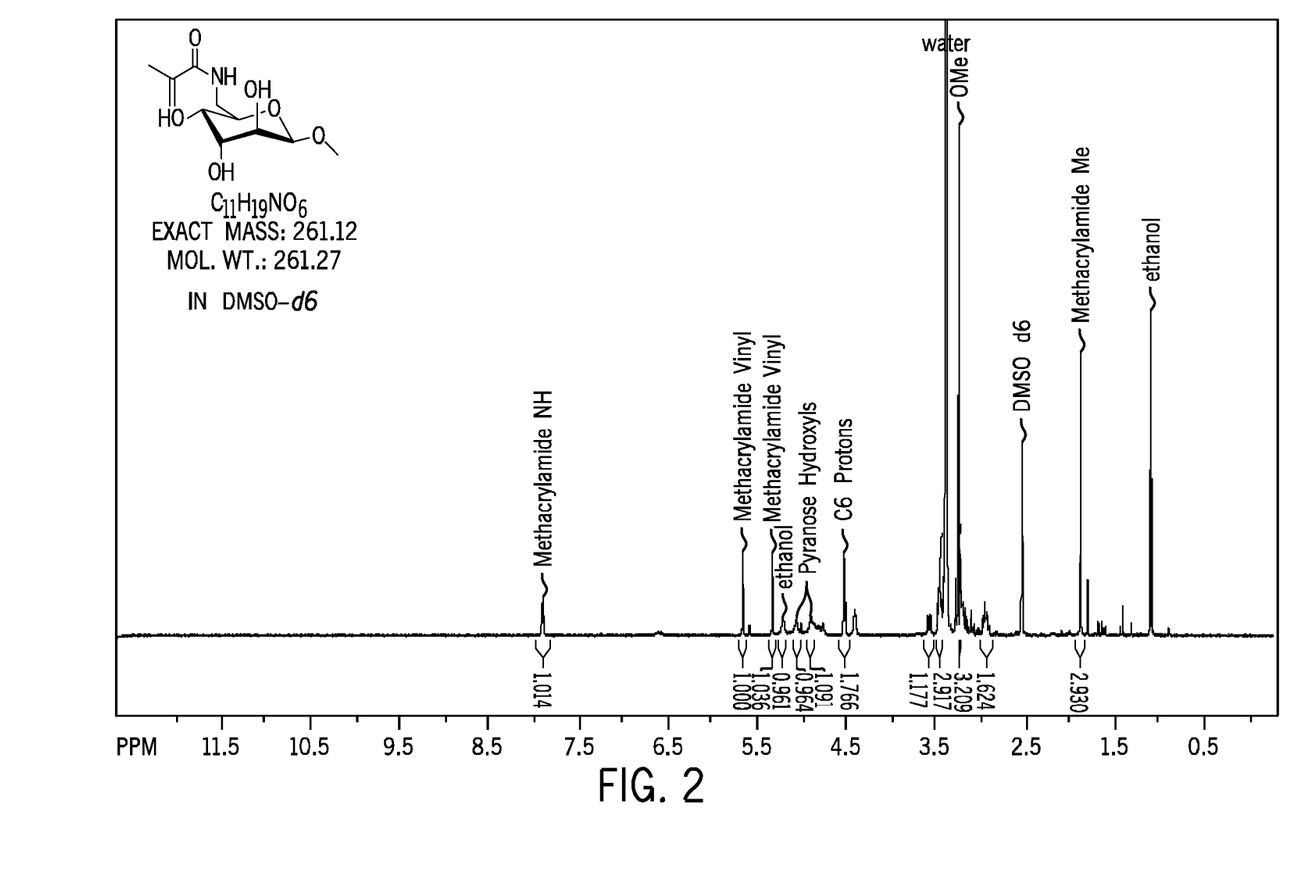
FIG. 2. 1H NMR of the N-(1-methyl-6-deoxy-D-glucose)-methacrylamide.

Synthesis of N-(1-methyl-6-deoxy-D-glucose)-methacrylamide. To a 1 L beaker was added 100 mL of deionized water. To the deionized water was added 11.000 g (103.790 mmol) of sodium carbonate. The sodium carbonate was allowed to dissolve into the water which took approximately an hour and a half. Once the sodium carbonate dissolved the beaker was placed into an ice bath and cooled to 0-2° C. To the cooled acetone/pyridine solution was added 11.000 g (40.130 mmol) of 1-methyl-6-deoxy-6-ammonium bromide-D-glucose and allowed to dissolve with very slow stirring. To a separate 250 mL beaker was added 100 mL hexanes. To the hexanes was added 4.05 mL of methacryloyl chloride and the two mixed together. This solution was added dropwise to the water solution to generate a biphasic system. This biphasic reaction system was stirred slowly overnight. The contents of the beaker were then poured into a separatory funnel, the layers allowed to separate, and the water layer was added to a round bottom flask. The water was then removed using rotary evaporation. Acetone was added to the solid contents and then rotary evaporated. Ethanol was added to the solid material, dissolving the organics while the inorganic materials did not dissolve. The ethanol was filtered to remove the insoluble inorganic materials followed by removal of the ethanol by rotary evaporation. The solid contents were then recrystallized from ethanol/acetone to yield 14.721 g of material or 141% of the theoretical yield. The reason for the excess is due to leftover water and bromide in the material. The 1H NMR of the N-(1-methyl-6-deoxy-D-glucose)-methacrylamide is shown in FIG. 2. The compound was placed under vacuum on dry ice overnight to help remove additional water and excess ethanol from the recrystallization.

Example 3

Synthesis of N-(6-deoxy-D-galactose)-acrylamide. Anhydrous THF (500 mL) is added to a flame dried 1 L three neck flask containing a magnetic stir bar and flooded with argon. The temperature is reduced to −20° C. followed by addition of anhydrous 6-amino-6-deoxy-D-galactose hydrochloride (30.0 g) and anhydrous pyridine (15.6 g). Subsequent drop wise addition of acryloyl chloride (13.1 g) in THF (50 mL) to the 6-amino-6-deoxy-D-galactose solution is followed by warming to room temperature. The reaction is allowed to proceed to completion. Upon completion, the solution is filtered to remove pyridinium chloride salts, the salts washed with additional THF, and combined filtrate and washings are subjected vacuum removal of the solvents to yield N-(6-deoxy-D-galactose)-acrylamide.

Example 4

Synthesis of N-(6-deoxy-D-galactose)-methacrylamide. Using a similar procedure as outlined in Example 2, 6-amino- 6-deoxy-D-glucose is reacted with methacryloyl chloride to yield N-(6-deoxy-D-galactose)-methacrylamide.

Example 5

Synthesis of N-(6-deoxy-D-galactose)-acrylamide. Using a similar procedure as outlined in Example 3, pyridine is replaced with potassium carbonate to yield N-(6-deoxy-D-galactose)-acrylamide.

Example 6

Synthesis of N-(6-deoxy-D-galactose)-acrylamide by use of a biphasic system. Anhydrous THF (500 mL) is added to a flame dried 1 L three neck flask and flooded with argon. water may be added 30.0 g of anhydrous 6-amino-6-deoxy-D-galactose hydrochloride (30.0 g) is dissolved in deionized water (150 mL), neutralized with sodium hydroxide (3.4 g), and added to the THF. A solution of acryloyl chloride (13.1 g) in methylene chloride (100 mL) is then added to the 6-amino-6-deoxy-D-galactose solution at room temperature and stirred rapidly to form an emulsion. Dropwise addition of sodium hydroxide (1 M) maintains the pH above 7, and the reaction is allowed to proceed to completion. Upon completion, the stirring is stopped and the phases are allowed to separate. The methylene chloride layer is extracted and the water layer is washed with three 25 mL portions of methylene chloride. The organic layers are combined, dried, and the solvent removed in vacuo to yield N-(6-deoxy-D-galactose)-acrylamide.

Example 7

Synthesis of multi-functional crosslinking agent N,N-(2,6-deoxy-D-glucose)-2,6-acrylamide. Anhydrous THF (500 mL) is added to a flame dried 1 L three neck flask and flooded with argon. 2,6-diamino-2,6-dideoxy-D-glucose hydrochloride (38.6 g) and pyridine (32.5 g) are added and the solution is cooled to −20° C. Methacryloyl chloride (33.2 g) in dry THF (55 mL) is then added dropwise to the 2,6-diamino-2,6-dideoxy-D-galactose solution at −20° C., followed by warming to room temperature. The reaction is allowed to proceed to completion. Upon completion, pyridinium chloride is removed by filtration, the pyridinium chloride washed with THF, and the combined organic solution subjected to in vacuo removal of solvent to yield N,N-(2,6-deoxy-D-glucose)-2,6-acrylamide.

Example 8

Synthesis of N,N-(2,6-deoxy-D-galactose)-2,6-acrylamide. Using a similar procedure as outlined in Example 1, 2,6-diamino-2,6-dideoxy-D-galactose is reacted with acryloyl chloride to yield N,N-(2,6-deoxy-D-galactose)-2,6-acrylamide.

Example 9

Synthesis of N,N-(2,6-deoxy-D-glucose)-2,6-acrylamide. Using a similar procedure as outlined in Example 5, pyridine is replaced with potassium carbonate to yield N,N-(2,6-deoxy-D-glucose)-2,6-acrylamide.

Example 10

Synthesis of N,N-(2,6-deoxy-D-glucose)-2,6-methacrylamide. Using a similar procedure as outlined in Example 2, 2,6-diamino-2,6-dideoxy-D-glucose is reacted with methacryloyl chloride to yield N,N-(2,6-deoxy-D-glucose)-2,6-methacrylamide.

Example 11

Preparation of a particular acrylamide pyranose polymer: poly(N-(6-deoxy-D-galactose)-acrylamide). To a four-neck 500 mL flask equipped with a mechanical stirrer, a dropping funnel, and a condenser, is added N-(6-deoxy-D-galactose)-acrylamide monomer ("NMA", 20 g), distilled water (50 ml), and tetrahydrofuran (150 mL). The flask is warmed to 60° C. with stirring, and 2,2'-azobis(4-methoxy-2,4-dimethylvaleronitrile) is added as a polymerization initiator. The solution changes into a gel-like material upon nearing completion. Consumption of monomer is confirmed by silica gel thin layer chromatography (TLC). Upon completion, the reaction mixture is concentrated under reduced pressure at room temperature. The remaining water is removed by freeze-drying to isolate poly(N-(6-deoxy-D-galactose)-acrylamide) as a white solid.

Example 12

Synthesis of a particular acrylamide pyranose polymer hydrogel. N-(6-deoxy-D-glucose)-acrylamide (2.7 g) and N,N-(2,6-deoxy-D-glucose)-2,6-methacrylamide (0.3 g) is added to distilled water (6 mL) and mixed thoroughly. Propylene glycol (3 ml) is added to the solution followed by the addition of Darocur 1173 (0.2 g). The solution is exposed to 350 nm UV light for 5 minutes to initiate polymerization, which upon completion yields the hydrogel.

Example 13

Synthesis of a particular acrylamide pyranose-methacrylate copolymer. To a three-neck reaction kettle outfitted with a condenser, argon inlet, and stirrer is added 10.0 g of N-(6-deoxy-D-galactose)-acrylamide, 4.0 g acrylic acid, and 6.0 g of ethyl methacrylate and 60 mL of THF and mixed thoroughly. The solution is deoxygenated and warmed to 70° C. To the warmed solution is added 5% azobisisobutyronitrile ("AIBN") in THF (5 mL) by dropwise addition. The reaction is allowed to proceed to completion. The polymer is precipitated from the liquor by addition of a 1:1 (v/v) ethanol/hexane solution, followed by filtration of the polymer. The liquor is precipitated two more times with a 1:1 ethanol:hexane mixture. The combined polymer precipitates are dried under vacuum to yield the acrylamide pyranose-methacrylate copolymer.

Example 14

Synthesis of a particular acrylamide pyranose/sodium acryloyldimethyltaurate copolymer. To a three-neck reaction kettle outfitted with a condenser, argon inlet, and stirrer is added N-(6-deoxy-D-galactose)-acrylamide (10.0 g), sodium acryloyldimethyltaurate (6.0 g) and deionized water (60 mL). The solution is thoroughly mixed, deoxygenated, and warmed to 70° C. To the warmed solution is added 6% (w/v) ammonium persulfate (5 mL). The reaction is allowed to proceed to completion, followed by quenching with a 12% (w/v) sodium metabisulfite solution (5 mL). The reaction mixture is concentrated under reduced pressure at room temperature, and remaining water removed by freeze-drying to provide the acrylamide pyranose/sodium acryloyldimethyltaurate copolymer.

Example 15

A mannose methacrylate monomer synthesis. Acetone (50 mL), mannose substrate (7.2062 g, 0.04 mol), vinyl methacrylate (5.3822 g, 0.048 mol), *Candida Antarctica* lipase immobilized polymer (Novozym 435, 4.03 g), and a few granules of BHT (to inhibit radical generation) is added to a 100 mL flask equipped with a cooling condenser and subsequently flushed with argon. The solution is heated to 50° C. under stirring and allowed to react for 5 days under argon. Upon completion, the yellow solution is filtered to remove the lipase enzyme from the monomer solution. Flash chromatography (ethyl acetate:hexane:ethanol 7:2:1) on the crude product provides the semi-pure monomer (Rf=0.38). Solvent removal provides the semi-pure monomer as a pale yellow oil, which is subsequently dissolved in water for freeze-drying to yield the mannose methacrylate as a white powder.

Example 16

Synthesis of a mannose methacrylate polymer. To a 10 mL flask is added mannose methacrylate (0.4 g) and deionized water (3 mL) and the solution purged of oxygen. 2,2'-azobis (4-methoxy-2,4-dimethylvaleronitrile) (7.5 mg) is then added and the solution warmed to 65° C. until completion of polymerization. The mannose methacrylate polymer product is then precipitated using acetone and the resulting polymer dried under vacuum.

Example 17

Synthesis of a crosslinked mannose methacrylate hydrogel. To a 10 mL flask is added mannose methacrylate (0.4 g) and deionized water (3 mL) and the solution purged of oxygen. Darocur 1173 (30 mg) is then added, followed by poly (ethylene glycol) dimethacrylate crosslinker (0.04 g). Exposure to UV radiation (300-400 nm) for 3 minutes initiates polymerization. Completion of polymerization yields the hydrogel.

Example 18

Synthesis of N-(6-deoxy-D-galactose)-4-vinyl-benzamide. Anhydrous THF (500 mL) is added to a flame dried 1 L three neck flask and the flask purged with argon. The THF is cooled to −20° C. Anhydrous 6-amino-6-deoxy-D-galactose hydrochloride (30.0 g; 139.5 mmol) and anhydrous pyridine (15.6 g; 197.2 mmol) are then added. While maintaining at −20° C., 4-vinyl-benzoyl chloride (23.4 g; 140.5 mmol) in dry THF (50 mL) is added dropwise to the reaction mixture, followed by warming to room temperature. The reaction is allowed to proceed to completion. The resulting pyridinium chloride salts are removed by filtration and rinsing of the salts. The combined organic filtrate is subjected to vacuum to yield N-(6-deoxy-D-galactose)-4-vinyl-benzamide.

Example 19

Generation of a concrete slurry including an acrylamide pyranose polymer. Three gallons of 20% (w/w) poly(N-(6-deoxy-D-galactose)-acrylamide) polymer in water is prepared by adding the poly(N-(6-deoxy-D-galactose)-acrylamide) polymer to water. A 94 lb. bag of Portland Cement and 140 lb. of clean sand are to be dry mixed together. Two gallons of the 20% (w/w) poly(N-(6-deoxy-D-galactose)-acrylamide) polymer solution and one gallon of water are then added to the dry mix. The mixture is further mixed until all cement and aggregate appears to be lump free. The remaining gallon of 20% (w/w) poly(N-(6-deoxy-D-galactose)-acrylamide) polymer solution and an additional gallon of water are then mixed in to produce 21 gallons of polymer concrete.

Example 20

Generation of a concrete slurry without an acrylamide pyranose polymer, aka "unmodified concrete." A 94 lb. bag of Portland Cement and 140 lb. of clean sand are to be dry mixed together. Three gallons of water is then added to the dry mix. The mixture is further mixed until all cement and aggregate appears to be lump free. Two additional gallons of water is then mixed in to produce concrete.

In comparing the polymer concrete and the unmodified concrete slurry prior to curing, the flow properties of polymer concrete are expected to be better than the unmodified concrete. For example, the polymer concrete slurry is expected to be more elastic and flexible than the unmodified concrete slurry. Upon curing, the mechanical properties of the polymer concrete are expected to superior to the unmodified concrete. For example, the cured polymer concrete is expected to have a greater compressive strength and tensile strength than the cured unmodified concrete. Moreover, the cured polymer concrete is expected to have greater flex than the unmodified polymer concrete, providing greater resilience and longevity to the cured polymer concrete.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A composition comprising:
 a cement component; and
 an amidyl pyranose component comprising an amidyl pyranose polymer represented by Formula I or II:

(I)

(II)

wherein each $R_1$ is individually H, cyano, or $C_1$-$C_8$ alkyl.

2. The composition of claim 1, wherein the cement component is Portland cement, a calcium sulfate, a calcium aluminate, a calcium silicate, lime or grit.

3. The composition of claim 1, wherein the amidyl pyranose component comprises an aqueous solution.

4. The composition of claim 3, wherein the aqueous solution contains about 20 wt % of the amidyl pyranose polymer.

5. The composition of claim 1, wherein each $R_1$ is individually H, cyano, methyl, ethyl, propyl, isopropyl, n-butyl, sec-butyl, tert-butyl, n-pentyl, n-hexyl, n-heptyl, n-octyl, 2-ethylhexyl, or isomers thereof.

6. The composition of claim 1, wherein each $R_1$ is individually H or methyl.

7. The composition of claim 1, wherein the amidyl pyranose polymer further comprises a repeat unit that includes a cross-linking moiety.

8. The composition of claim 7, wherein the amidyl pyranose polymer is represented by Formula III or IV:

(III)

-continued

(IV)

9. The composition of claim 1, where the amidyl pyranose polymer further comprises a repeat unit that includes a non-pyranose acrylamide moiety, wherein the amidyl pyranose polymer is represented by Formula V or VI:

(V)

(VI)

wherein.
$R_2$ is $C_1$-$C_8$ alkyl, $C_1$-$C_8$ heteroalkyl, $OR_3$, or $NR_4R_5$;
$R_3$ is $C_1$-$C_8$ alkyl or poly(alkylene glycol);
$R_4$ is H, $C_1$-$C_8$ alkyl, or $C_1$-$C_8$ heteroalkyl; and
$R_5$ is H, $C_1$-$C_8$ alkyl, or $C_1$-$C_8$ heteroalkyl.

10. The composition of claim 9, wherein $R_2$ is $OR_3$ where $R_3$ is poly(alkylene glycol).

11. The composition of claim 10, wherein the poly(alkylene glycol) is poly(ethylene glycol) or polypropylene glycol).

12. The composition of claim 9, wherein $R_2$ is nitrogen-bound taurine or a salt thereof.

13. The composition of claim 1 further comprising an aggregate component.

14. The composition of claim 1 further comprising water.

15. A method comprising combining an amidyl pyranose component with a cement component to form a modified cement mixture, wherein the amidyl pyranose component comprises an amidyl pyranose polymer represented by Formula I or II:

(I)

(II)

wherein each $R_1$ is individually H, cyano, or $C_1$-$C_8$ alkyl.

16. The method of claim 15, wherein the combining further comprises combining an aggregate component.

17. The method of claim 15, wherein the combining further comprises combining an aqueous component.

18. The method of claim 15, wherein the cement component is Portland cement, a calcium sulfate, a calcium aluminate, a calcium silicate, lime or grit.

19. The method of claim 15, wherein the amidyl pyranose component is in an aqueous solution.

20. The method of claim 19, wherein the aqueous amidyl pyranose component is about 20% by weight amidyl pyranose polymer solution.

* * * * *